INVENTORS
THOMAS PROCTOR
NORMAN L. LA DUKE

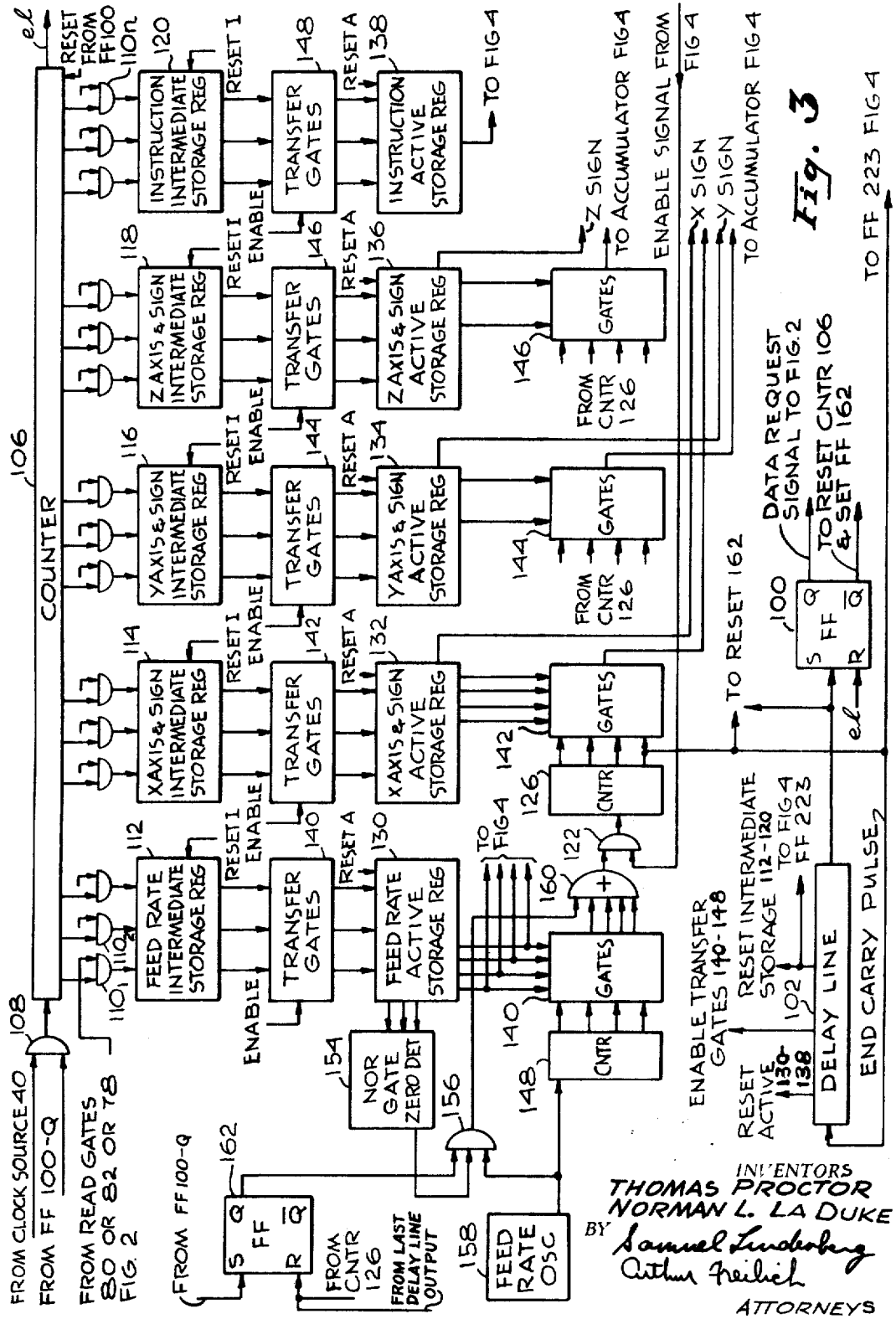

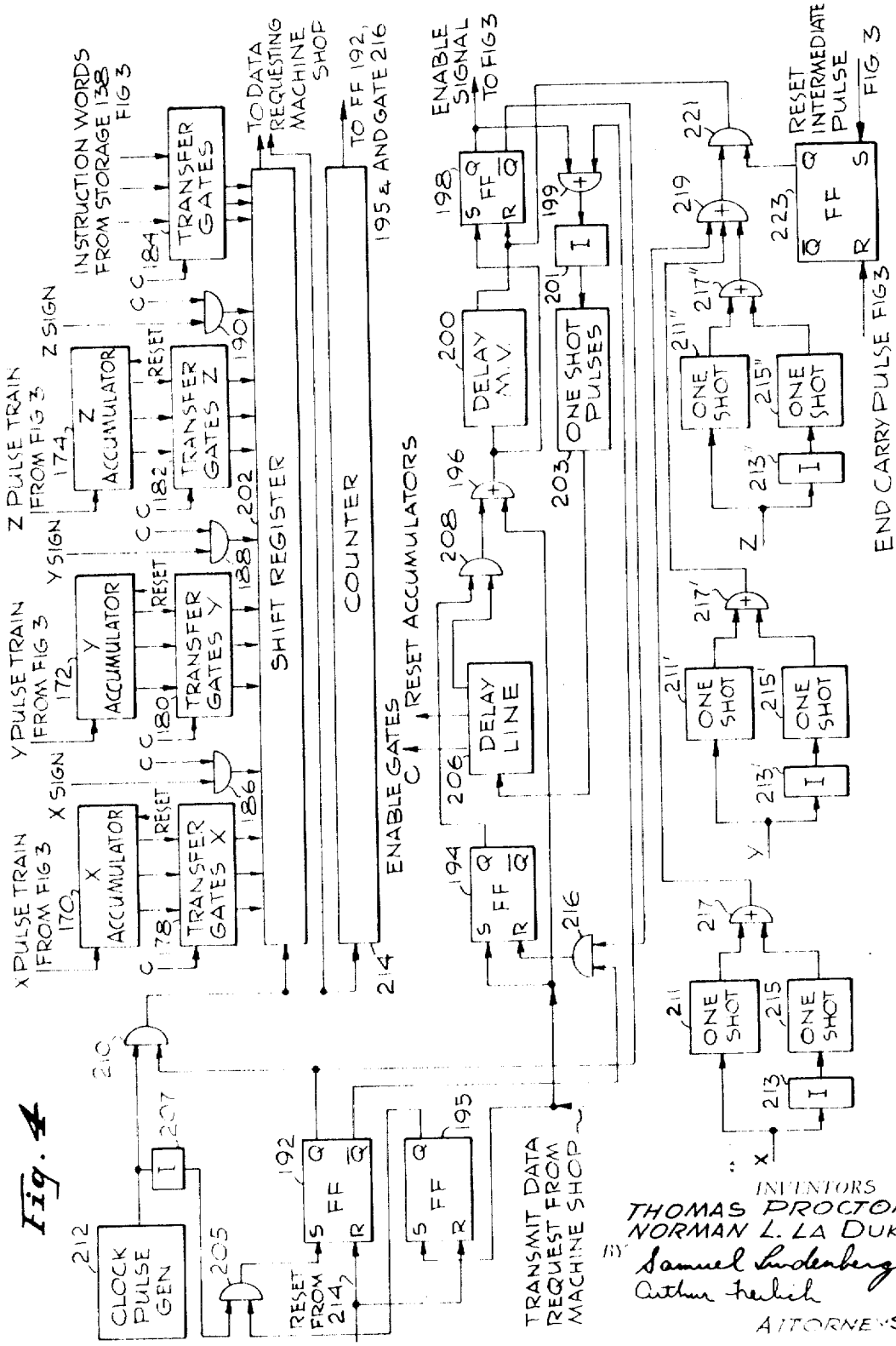

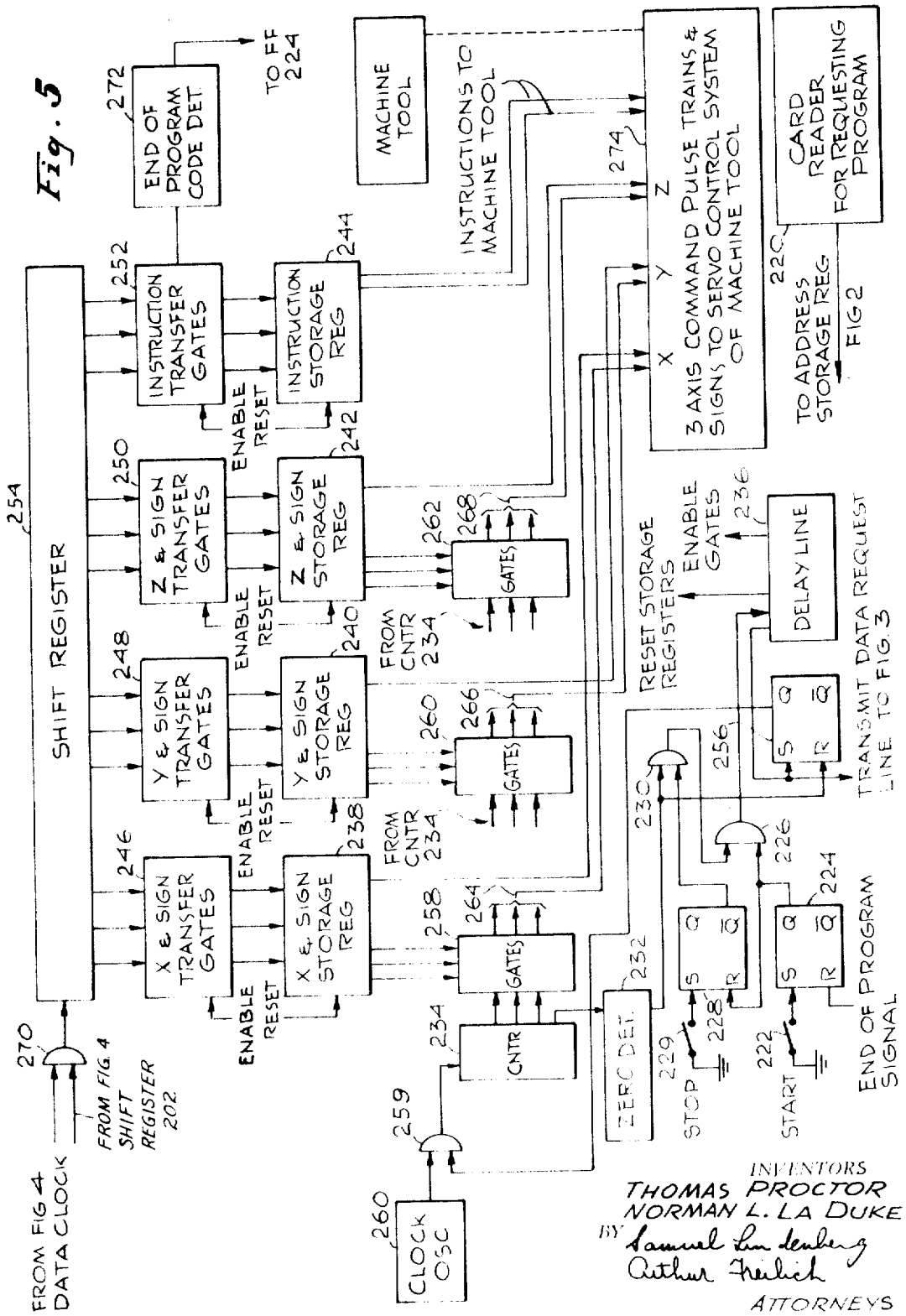

United States Patent Office 3,465,298
Patented Sept. 2, 1969

3,465,298
TIME SHARED AUTOMATIC MACHINE TOOL CONTROL SYSTEM
Norman L. La Duke, Willoughby, and Thomas Proctor, Lyndhurst, Ohio, assignors to The Bunker-Ramo Corporation, Canoga Park, Calif., a corporation of Delaware
Filed Oct. 26, 1966, Ser. No. 590,142
Int. Cl. G11b *13/00;* G06f *1/00, 15/46*
U.S. Cl. 340—172.5                  19 Claims

ABSTRACT OF THE DISCLOSURE

A system for numerical machine tool is provided wherein a centrally located computer facility stores a large number of numerical machine tool control programs. Means is provided at each of a plurality of numerical machine tools for requesting the central facility to provide a particular program. Means is provided at the central facility for obtaining the program and feeding it to the machine tool requesting it in predetermined increments which can be executed by the machine tool. In this manner the central facility can service a large number of remotely located numerically controlled machine tools on a time shared basis.

---

This invention relates to systems for controlling the operation of machine tools in response to a sequence of data signals and more particularly to improvements therein.

In the previously devised automatic machine tool control systems, the coded program derived by using a general purpose digital computer is recorded. This coded program contains all the instructions which must be carried out in order that a machine tool, such as a milling machine, can shape a work piece in a desired manner.

The program is usually stored on paper tape or some other storage medium. The paper tape is then fed to apparatus, usually known as a director, which converts the program information into electrical signals suitable for controlling a servo mechanism or other control apparatus, as well as the machine tool controls for causing the machine tool to operate in response to those instructions in order to properly shape a work piece. Automatic machine tool control systems of this general type are described, for example, in Patent No. 2,833,941 to Rosenberg et al. and Patent No. 3,079,522 to McGarrell.

Each automatic machine tool installation presently requires tape play-back mechanism for reading the recorded digital figure and electronic equipment for converting the output of the tape play-back mechanism into instruction and motion command signals which can be performed by the machine tool. Command signals may be considered to be those signals which actually cause work piece and tool relative motions, whereas instruction signals can be thought of as those signals which convey other information, such as turning on the coolant, spindle speed rate, etc.

The equipment for reading the tape and converting the information into a form to which the machine tool can respond is rather expensive. In addition, the machine tool shop operator must either own a library of tapes for the parts which his automatic machine tool can make or must have borrowing access to a central library where such tapes are kept. The central library concept has not found much favor in view of the delays attendant to having the tape delivered to the machine tool shop for use and, just as in the case of a library of books, it can happen that a particular tape may be in use by others, whereby another delay is encountered.

An object of the present invention is to provide a system wherein programs for operating machine tools are stored at a central location and machine tool shops which are distributed over a geographical area can communicate with the centrally located computer in which these programs are stored and can have the program transmitted, and the machine tool is operated directly in response thereto.

Yet another object of the present invention is to provide an organization whereby a centrally located computer which has recorded programs for controlling an automatic machine tool has its programs made accessible on a time-sharing basis to a plurality of automatic machine tools.

Yet another object of the invention is a novel system for time-sharing programs by a plurality of automatic machine tools, which reduces the cost of machine tool control installations at each of the machine tool locations.

These and other objects of the invention are achieved in an arrangement wherein at a central location there is provided memory apparatus for storing a plurality of different programs including instructions and commands for operating an automatic machine tool. Each program is allotted a specific storage region within the memory, and the storage region has associated therewith the address for the program.

Each one of the machine shops which is to be serviced by the central system is provided with storage means, such as punched cards, each of which has the address of a specific program in the memory with indications as to what a machine tool will do in respone to that program.

A machine tool shop which desires a program from the central system places a card with the address of that program in a conventional card reader which, as a result, transmits the program address signals to the central location. There the program address is stored, as well as any program addresses which have been transmitted from any other machine shops. Apparatus is provided for sequentially permitting the program storage memory to be addressed and to read out a first increment of the program at the address specified by the machine shop punched card. This segment of the program is stored and converted into predetermined machine tool operation time segments, which are sent back to the machine shop sequentially for directly operating a machine tool at that location. Meanwhile, the address from the machine shop, stored at the central location, is incremented so that when the program increment which has been read out of the memory has been completely transmitted to the machine shop, the next increment at the incremented address is read out of the memory and similarly processed into predetermined time segments.

This procedure is repeated until the end of the program which has been requested by the machine shop, at which time the apparatus is ready to receive the next program request. This "communication" between machine shop and central system location is carried out on a time-shared basis for all of the machine shops which are connected into the central location.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 3 is a block schematic diagram illustrating how the program segment which has been read out is converted into command pulse trains;

FIG. 4 is a block schematic diagram illustrating how these command pulse trains are converted into 15-millisecond blocks which are then converted back into coded form and transmitted to the machine tool shop; and FIG. 5 illustrates the apparatus at the machine tool shop which converts the code back into a pulse train for controlling the machine tool, and then sends a request back to the central location for more program.

Figure 1:
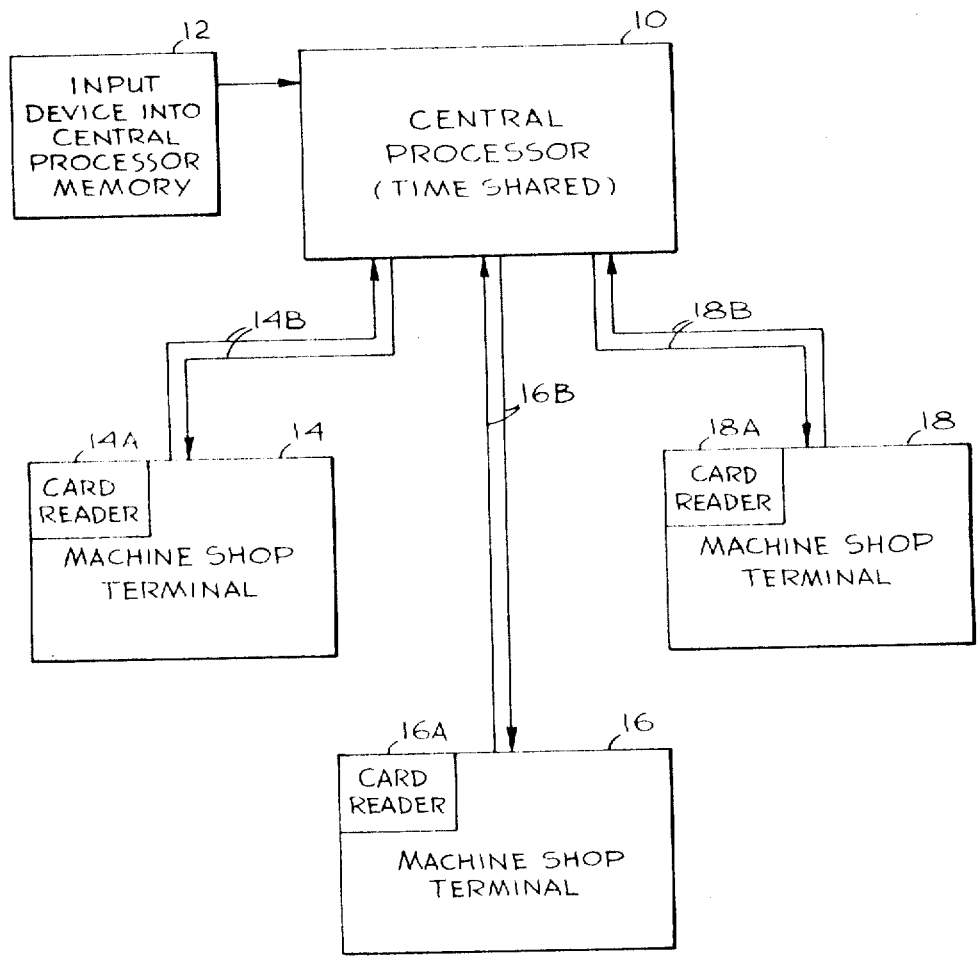
FIGURE 1 is a schematic diagram of an embodiment of the invention.

The system—FIG. 1

Referring now to FIG. 1, there may be seen a block schematic diagram of the embodiment of the invention. The central processor 10 may effectively be a computer memory system with the usual data read-in and read-out capability. The computer memory has stored therein a plurality of machine tool programs. These may be entered into the central processor memory by means of an input device 12, which can be either a large general purpose computer, magnetic or paper tape which is read into the memory, or any other well known equivalent. The format for each program which is stored is preferably digital, as by being either the EIA standard format (BCD) or a fixed sequential binary format. Each program is broken down into program segments, each of which actually consists of digital words representing instructions to the machine tool, X, Y and Z axes command words and sign words to indicate the distance and direction of motion of the machine tool along these three axes, and a feed rate word indicative of the rate at which the motion is to occur. Each program segment represents motion required for a traverse along a line without changing direction or along a curve. The last program segment includes an "end of program" code word.

Each program occupies a predetermined region of the memory of the central processor, with the program segments being stored sequentially. Each one of the machine shop terminals, respectively 14, 16, 18, has a list of the addresses within the central processing memory for the beginning of the program or the first program segment for each one of all of the programs which are stored in this memory. Each machine shop terminal may address the memory of the central processor with the address of a program which is desired. If the program address is stored on punch cards, the selected program address card is inserted in a punched card reader, respectively 14A, 16A, and the address is read over the respective communicating lines 14B, 16B, which couple each one of the respective machine shop terminals to the central processor. The central processor has provision for storing these addresses and for sequentially addressing the memory and sequentially reading out the beginning of the stored program. The central processor divides the motion command words into command words which command motion during a predetermined interval determined, for example, as 15 milliseconds. These command words together with the instruction information and the signs are sent back to the machine shop terminals where they are executed. The machine shop terminal then sends back a request for further data, and this is processed. The stored address at the central processor is updated, as required, so that the successive segments of a complete program may be read out as required by the machine tool for executing the program.

Figure 2:
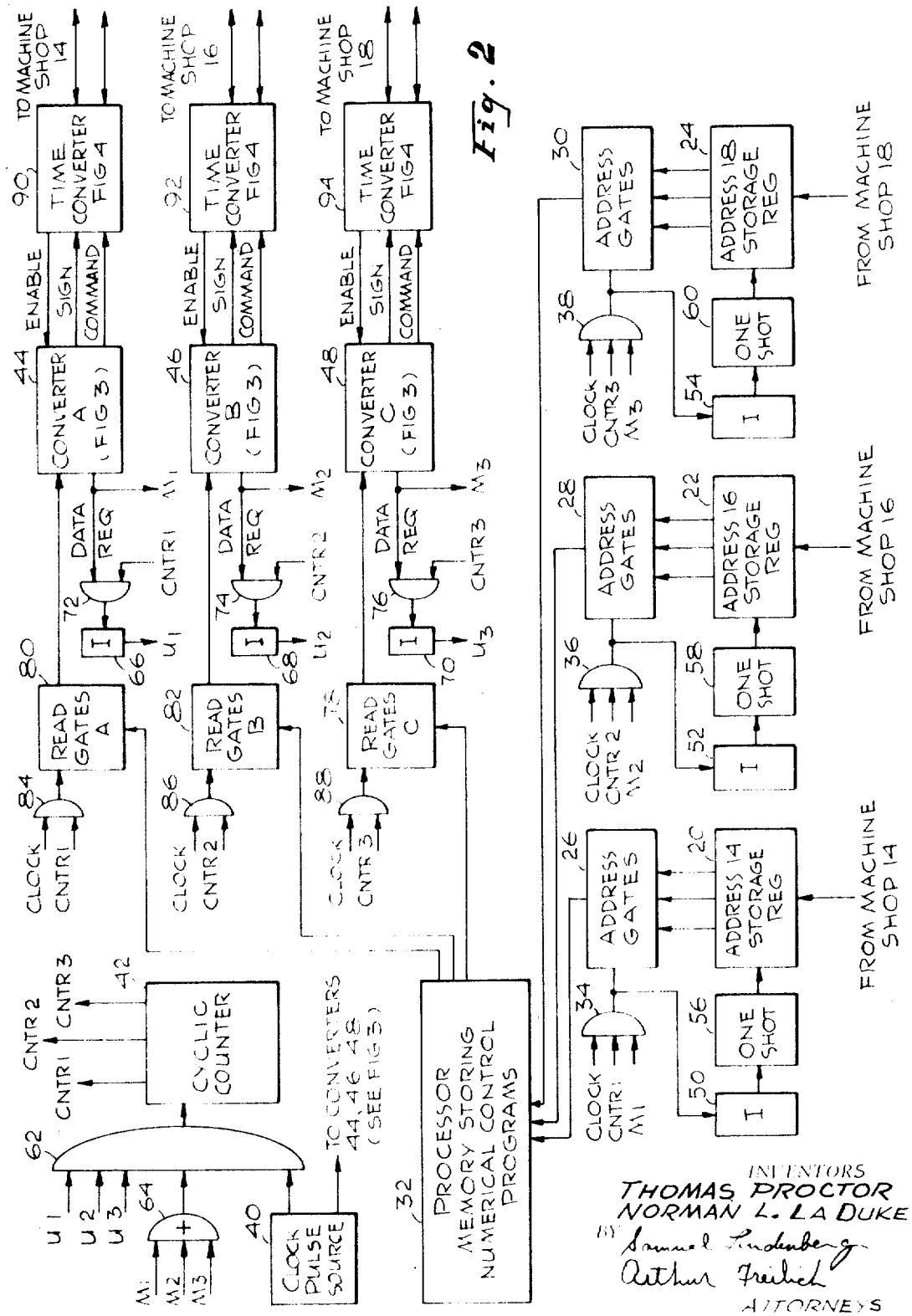
FIG. 2 is a block schematic diagram illustrating the system for addressing the program storing memory by a plurality of machine shops and for reading out a program segment for each one of these machine shops.

An exemplification of the format for the program code, which may be stored in the processor memory, is described at some length in the aforementioned Patent No. 3,079,522 to McGarrell. It is to be assumed that, as previously indicated, a plurality of programs are stored in the central processor memory. Each one of the machine shop terminals sends its request for a program, which is the coded address of the program to the central processor over the respective lines 14B, 16B, 18B. FIGS. 2, 3, and 4 are illustrative of the apparatus included in the central processor. FIG. 2 is a block schematic diagram illustrating how the memory in the central processor is addressed in response to the program request which constitutes an address and how the program information read out of the memory is processed thereafter.

The central processor—FIG. 2

At the central processor there is provided an address storage register, respectively 20, 22, 24, for each machine shop. These address storage registers may be connected to the machine shops by a suitable communication means such as a telephone line or through a transmitter-receiver system. The address information is received by the processor and stored in the appropriate storage register. Each storage register has a set of address gates, respectively 26, 28, 30, associated therewith, each of which is independently capable of addressing the memory 32 of the central processor 10. However, while each address storage register enters its address into the address gates associated therewith, the address gates cannot address the memory until enabled by the output of an associated AND gate, respectively 34, 36, 38. Each one of these AND gates is enabled by an output from a clock pulse source 40, from a cyclic counter 42, and from a signal designated respectively as M1 or M2 or M3, corresponding to a data request signal from the respective converter circuits 44, 46, 48, whose operation will be explained in connection with FIG. 3.

A program for milling a work piece to have a desired shape will contain a series of program segments. These program segments are composed when a model is analyzed for the purpose of determining what motions are required of a milling machine table relative to the milling tool, for example, in order to properly manufacture the desired item. Thus each program segment represents motion in a given direction along a straight or curved path, which program segment is changed when the end of that path is reached.

Each of the addresses as initially read into the address storage registers, respectively 20, 22, 24, comprises the address of the first program segment in a program. Thereafter, as each program segment is read out of the memory, it is necessary to increment the address for the purpose of reading out the next program segment. Apparatus for incrementing the address in a storage register is well known, being exemplified, for example, in a patent to E. J. Schneberger et al., No. 3,258,748. However, an arrangement which is suitable is shown in FIG. 2. It constitutes an inverter, respectively 50, 52, 54, which is driven in response to an output of the respective AND gates 34, 36, 38 and which in turn drives the respective one-shot circuits 56, 58, 60. These one-shot circuits are connected to the end stage of each address register and provide a pulse which adds "one" to the end stage. Each inverter acts in the usual manner to present an output only when there is no input signal applied. Accordingly, when the AND gates which drives the inverter applies an input, its output is removed. However, it is not until the AND gate output is removed that the inverter can then apply an output to the one-shot causing it to generate an output pulse to insert a "one" into the last stage of the address storage register. Accordingly, after the address gates have addressed the memory, a "one" is inserted into the address storage register, incrementing it so that it stores the address of the succeeding instructions and commands in the program. The address storage register also at this time updates the address gates 26.

The cyclic counter 42 has its count advanced in response to the output of an AND gate 62. The clock pulse source is one input to this AND gate. A second input to this AND gate is one of the data request signals M1, M2, or M3, all of which are applied to an OR gate 64, the output of which is connected to the AND gate 62. Third, fourth and fifth required inputs to the AND gate 62 are designated as U1, U2, and U3. These inputs are the outputs of inverters respectively 66, 68, and 70. These inverters receive an output from the respective AND gates 72, 74, 76. The respective AND gates are enabled to apply an output to the respective inverters only, for AND gate 72, in the presence of a data request signal from the converter 44 and the cyclic counter being in its "one" count stage; for the AND gate 74, when there is a data rerequest has been filled. Thus, assume that the counter is in in its "second" count state; and for AND gate 76 when the converter 48 provides a data request signal and the counter is in its "third" count state.

The purpose of the logic at the input to the cyclic counter 42 is to enable the cyclic counter to advance to the next data request and to wait at that point until this data request has been filled. Thus, assume that the counter is in its "first" count state and there is a data request out of converter 48. There are no other data request signals being provided by the other counters. In that case, none of the AND gates 72, 74, 76 are providing an output, and therefore the three inhibit signals U1, U2, and U3 are present at the input to the AND gate 62. There is a data request signal, M3, and the clock pulse source is providing clock pulses. Accordingly, the cyclic counter will advance until it reaches its "third" count condition, at which time the inverter 70 receives an input from the AND gate 76 and the U3 signal is eliminated. The address gate 30 are enabled, since AND gate 38 is now receiving a clock-pulse signal, the third count signal, and the M3 signal. Thus the address gates 30 address the memory 32, and the output signals are directed to READ gates 78.

There are provided at set of READ gates, respectively 80, 82, and 78 for each one of the machine shop stations. Each one of the READ gates is enabled to receive the output from the memory only in the presence of an enabling signal from an AND gate 84 for READ gates 80, AND gate 86 for READ gates 82, and AND gate 88 for READ gates 78. Thus, in the example just described, the cyclic counter will remain in its third count state and READ gates 78 are enabled to receive the output of the memory at the address indicated by the address gates 30.

The READ gates transfer the motion command and instruction data to the associated converter, an arrangement for which is shown in FIG. 3. The converter converts the command word into pulse trains and sends these to an associated time converter, respectively 90, 92, 94. The time converter sends a signal back to its associated converter when it is ready to measure pulses over a predetermined interval. This "timed data" is then transmitted to the machine shop on a request for data therefrom, and the time converter also sends a signal designated as "enable" to its associated converter to instruct the converter to send the next pulse train.

The converter—FIG. 3

FIG. 3 is a block schematic diagram illustrating the arrangement for any one of the converters 44, 46, 48, in accordance with this invention. A flip-flop circuit 100 is set by the output from a delay line 102. The flip-flop circuit output, when in its set state, comprises a data request signal of the type shown as being applied to the AND gate 72 in FIG. 2, for example. As indicated in the previous description, upon receiving the data request signal, the circuitry shown in FIG. 2 arranges to read data including instruction words and motion command words out of the memory into a set of READ gates. As shown in FIG. 3, a clock oscillator 40 can advance a counter 106, only when an AND gate 108 is enabled, by the data request signal from flip-flop 100.

The counter 106 successively enables AND gates $110_1$, $110_2$ . . . $110_n$, there being an AND gate for each data bit in the instruction and command words read into the READ gates from the memory. Alternatively, if desired, each count of the counter may enable a group of gates to enable the simultaneous transfer of a word or words into the respective registers. The other input to each one of the AND gates is an output from one of the READ gates. It should be appreciated, therefore, that when the counter 106 is enabled to count, it successively enables the input gates $110_1$ through $110_n$, whereby the data in the READ gates is entered into the respective intermediate storage registers, designated as feed rate intermediate storage register 112, respective X, Y, and Z axes and sign storage registers 114, 116, and 118, and the instructions intermediate storage register 120. With a fixed format for the instructions and commands, there can be a direct transfer in the manner indicated from the READ gates into the respective intermediate storage registers.

When the counter counts to its last count state, it produces an output signal designated as EL or end-of-line signal. This signal is applied to the flip-flop 100 to drive it to its reset state. This signal indicates that the data request has been satisfied. The counter is reset by the reset output of the flip-flop 100.

Before the flip-flop 100 can provide a data request signal, it is necessary that it be driven to its set state by the output of the delay line 102. Initially this is achieved by the receipt of a series of enable signals from the time converter circuits shown in FIG. 4. These singals are applied to an AND gate 122. The AND gate is enabled to pass the pulse train from an OR gate 160 to a counter 126 during each enable signal. The pulse train from OR gate 160 is initially supplied from an AND gate 156, it being enabled by the initial zero condition of a feedrate active storage register 130 and the initial set state of a flip-flop 162. The feedrate active storage register zero state is detected by a zero detector circuit 154 (NOR gates) which then supplies an output to AND gate 156. The counter 126 will be driven to its last count state by the pulse train output from AND gate 122, at which time it will supply a pulse to the delay line 102 and to reset flip-flop 162. (This process will require several enable signals from the time converter, FIG. 4). The delay line successively emits four pulses in response to its input. The first of these four pulses resets active storage registers, respectively 130, 132, 134, 136, 138. The second of these pulses enables transfer gates 140, 142, 144, 146, and 148 whereby they can transfer the contents of the intermediate storage registers 112 through 120 respectively into the active storage registers 130 to 138 respectively. The third pulse output from the delay line 102 resets or clears all of the intermediate storage registers, and the fourth output pulse from delay line 102 sets flip-flop 100 and resets flip-flop 162.

It should be appreciated that the outset, when an enable signal is first received, while the delay line emits four pulses, the intermediate storage registers and the active storage registers will have been cleared or reset in a previous operation and so, on the initial operation of the delay line in response to a first enable signal, the intermediate storage registers and active storage registers are storing all zeros. The respective storage registers 130, 132, 134, 136, and 138 respectively receive the feedrate word, X axis and sign word, Y axis and sign word, Z axis and sign word, and instruction words. The feedrate word, X axis word, Y axis word, and Z axis word are respectively converted to pulse trains by apparatus such as is described and shown in the previously mentioned McGarrell Patent No. 3,079,522. This effectively comprises an arrangement wherein a binary counter has each one of its count stages connected to a separate gate. It will be appreciated that, when all the gates are enabled, the first gate connected to the first stage of the binary counter will produce pulses at a frequency twice that of the second gate which is connected to the second stage of the binary counter, while the third gate produces pulses at twice the frequency of the second gate, since it is connected to the third stage of the binary counter. The gates are selectively enabled in response to the respective bits of a word, which, in the case of the feedrate, represents a desired pulse frequency. In the case of the three axes, the word for each axis represents a desired number of pulses. Thus, when the feedrate and axis words are all zeros, no pulses are obtained at the outputs from the gates associated therewith, which are respectively gates 140, 142, 144, and 146. Gate 140 is connected to the output of counter 148. Gates 142, 144, and 146 are connected to the output of counter 126.

A zero detector 154 comprises a NOR gate connected to each stage of the feedrate active storage register 130 and produces an output only when the feedrate word is all zeros. The output of the NOR gate is applied to an AND gate 156 to enable it to pass pulses from a feedrate oscillator 158. The feedrate oscillator output is also applied to the counter 148 which serves the feedrate gates 140. Thus, when a rapid traverse action is desired, the feedrate word is zero, whereby pulses from the feedrate oscillator are enabled to bypass the feedrate counter AND gates and be fed directly into the counter 126. The output of the AND gate 156 as well as those of the feedrate gates 140 are applied to an OR gate 160. The output of this OR gate, which consists of pulses either from AND gate 156 or from the feedrate gates 140, is passed only in the presence of an enable signal which is applied to the AND gate 122. The output of AND gate 122 drives the axis counter 126.

To summarize the operation of the system thus far, the first enable signal received from the time converter shown in FIG. 4 can cause the delay line to operate, whereby the flip flop 100 is set and sends out a data request signal. In response to this data request signal, the memory reads data into the READ gates, and the read gate data is transferred by means of the counter 106 into the intermediate storage registers. The storage registers are separated in accordance with the feedrate word, X axis and sign, Y axis and sign, Z axis and sign, and instruction words. At the end of the count of the counter 106, flip-flop 100 is reset. Its output resets the counter 106 and also sets a flip-flop 162. The flip-flop 162 set output enables an AND gate 156, whereby pulses from the feedrate oscillator 158 can be fed to advance the counter 126 at the same frequency as the feedrate oscillator provides output pulses. However, this only happens when the NOR gate or zero detector 154 detects a zero feedrate word in the active storage register. In the present case, since the first feedrate word has not yet been transferred into the active storage register from the intermediate storage register, the feedrate word is "zero" and counter 126 will be rapidly driven to its maximum count state again, whereupon an output is applied to the input of delay line 102 and also to the flip-flop 162 to drive it to its reset state. AND gate 156 is no longer enable, and therefore feedrate oscillator pulses are no longer directly fed to drive counter 126.

Delay line 102, in response to the pulse from the counter 126, provides a first output which resets the active storage registers again. Following this, a second output from the delay line enables the transfer gates 140 through 148 to transfer the words in the intermediate register into the active storage registers. The third output from the delay line resets the intermediate storage registers to place them in condition to receive the second program segment. The fourth output from the delay line which follows the third output drives the flip-flop 100 to its set state, whereby another data request signal is sent back to the structure shown in FIG. 2 for the purpose of ordering the second program segment. During this time, the words which have been introduced into the active storage registers are being processed, since they enable the gates, respectively 140, 142, 144, and 146, whereby pulse trains are generated in the manner previously described for commanding motion along the X axis, the Y axis, and the Z axis. The outputs of the gates 142, 144, and 146 along with their associated sign signals, and also any instruction word in the storage register 138, are sent to receiving structures shown in FIG. 4.

It has been indicated previously that the program data was being fed to the requesting machine shop terminal in predetermined time increments which, by way of example, were indicated as 15-millisecond increments. The duration of the enable signal which is received from the time converter apparatus of FIG. 4 is for only 15 milliseconds, and therefore the AND gate 122 will pass pulses to the counter 126 only during the 15-millisecond interval of the enabling signal. As will be shown, these 15-millisecond increments are generated in response to data request pulses from the machine shop terminal after it has completed storing the 15-millisecond program information.

The time converter—FIG. 4

FIG. 4 is a block schematic diagram of the time converter arrangement which receives data requests from the machine shop, in response to which the circuitry establishes a 15-millisecond enable signal for the converter circuit shown in FIG. 3. Each 15-millisecond pulse generated by the converter circuit is converted, by the circuitry shown in FIG. 4, back to command words, which are then sent to data requesting machine shop.

In response to an enable signal, the X, Y, and Z axes pulse trains are respectively fed into X, Y, and Z accumulators, respectively 170, 172, 174. These accumulators accumulate the pulses over the 15-millisecond interval, whereby the pulse pattern presented by the parallel output of each of these accumulators represents a word indicative of the number of motion pulses required in a 15-millisecond interval. These accumulators are counters which may count in straightforward binary fashion or binary coded decimal fashion—the coding is immaterial. What is significant, however, is that the pulse pattern provided by the stages of the accumulators present three code words representative of the number of pulses in a pulse train for a 15-millisecond interval. There are transfer gates, respectively 178, 180, and 182, for the respective X, Y, and Z axes, which have as their inputs the code pattern words applied thereto from the respective X, Y, and Z accumulators respectively 170, 172, and 174. The instruction words in the instruction storage register 138 in FIG. 3 are applied to transfer gate 184 in FIG. 4. There are provided AND gates respectively 186, 188, and 190 for the X axis, Y axis, and Z axis sign representative bits. The respective sign representative bits are applied to these AND gates from the respective X, Y, and Z axes active storage registers respectively 132, 134, and 136 in FIG. 3.

A transmit data request from a remotely located machine shop is applied to a first flip-flop 194 and to a second flip-flop 195, and to an OR gate 196. This data request signal drives the flip-flops to their set states. The OR gate 196, in response to the data request signal, sets a flip-flop 198 and applies a pulse signal input to a delay multivibrator 200. The delay multivibrator has a 15-millisecond delay, which is the interval indicated as the predetermined interval here. At the end of 15-milliseconds, flip-flop 198 is reset by an output from the delay multivibrator.

The set output of flip-flop 195 is applied to an AND gate 205. The other input to AND gate 205 is the output of an inverter 207. The inverter input is connected to a clock pulse generator 212, and thus the inverter provides an output signal only in the absence of a clock pulse. Accordingly, AND gate 205, when enabled, provides an output to set flip-flop 192 only in the absence of a clock pulse. Thus, the set output of flip-flop 192 also enables an AND gate 210 to pass clock pulses from a generator 212 to the requesting machine shop, to a shift register 202 to transfer out any data therefrom immediately to the data requesting machine shop, and to counter 214.

The set output of flip-flop 192 is also connected to an OR gate 199.

The output of flip-flop 198, when it is in its set state, is an enabling signal which is applied to AND gate 122 shown in FIG. 3. This output is also applied to the OR gate 199 shown in FIG. 4. The OR gate 199 also has, as its input, the "set" output of flip-flop 192. The OR gate output is connected to an inverter 201. The inverter cannot drive a single-shot pulse generator 203, however, until both of the OR gate inputs are removed, as occurs when flip-flops 192 and 198 are reset. When this occurs, then the inverter drives the one-shot pulse generator 203, whose pulse output is applied to the input of a delay line 206. It should be noted that the delay line will not receive an input pulse until the shift register 202 has been emptied, as indicated by flip-flop 192 being reset, and until flip-flop 198 is reset.

The delay line provides three outputs sequentially. The first of these, designated as C, enables the axis gates as well as the transfer gates and the sign gates so that all the information which is entered into the accumulators during the enable signal output from flip-flop 198 is transferred in parallel into the shift register 202. The second delay line output resets the three axis accumulators 170, 172, and 174 so that they are in condition to accept fresh data. The third delay line output is applied to an AND gate 208, which has as its second enabling input the output from the set output side of the flip-flop 194. The output of AND gate 208 is applied to the OR gate 196. Thus, when its two inputs are present, AND gate 208 can set flip-flop 198 to produce another 15-millisecond enable signal.

The output of the AND gate 210 causes the shift register 202 to shift its output serially out onto the line returning to the data requesting machine shop. The counter 214 has the same number of counts as the number of clock pulses required to shift the contents of the shift register 202 out. When the counter reaches its end count, it resets flip-flops 192 and 195. The reset output of flip-flop 192 is applied to an AND gate 216 which receives another required input from the reset output of the flip-flop 198. AND gate 216 functions to reset the flip-flop 194 when all the data in the shift register 202 has been sent to the data requesting machine shop and when there is no enable signal being sent to the circuit arrangement shown in FIG. 3.

Since the circuitry in FIG. 4 requests 15-millisecond pulse trains from the circuitry in FIG. 3, it can happen that within a 15-millisecond request interval the pulse trains generated by one program increment will terminate and the next program increment is inserted into active storage registers of FIG. 3 to be converted into pulse trains. It can also happen that one or more of the axis signs are changed at that time to indicate a change in direction. Because of problems which may arise at the machine tool when it is abruptly fed a sign change, it is desired to either signal this in advance or provide a hiatus in the command pulse trains. Circuitry is provided in FIG. 4 to sense a change in the X, Y, or Z sign and to terminate the enable signal at that time. The circuitry used is the same for each of the three axes. Accordingly, the circuit components will be correspondingly numbered with primed numbers for each axis, and the description will be given for only one axis.

The X sign signal is applied to a one-shot circuit 211 and to an inverter 213. The output of the inverter 213 is applied to a second one-shot circuit 215. The outputs of the two one-shot circuits are connected to an OR gate 217. The outputs of all the OR gates 217, 217' and 217" are applied to an OR gate 219. The output of OR gate 219 is applied to an AND gate 221. And gate 221 is enabled in the presence of a set output from a flip-flop 223. This flip-flop is driven by signals received from the structure of FIG. 3. The end carry pulse from counter 126 drives the flip-flop to its reset state, and the reset intermediate store output of delay line 102 drives the flip-flop to its set state.

The one-shot circuits 211, 217 are of the type which are responsive to a negative going signal. Thus, any change, either in a sign representative bit going positive, whereby the negative going output from the inverter can trigger one-shot circuit 215, or by a sign representative bit going negative, whereby one-shot circuit 211 is triggered, produces an output for OR gate 217. OR gate 219 merely collects all the outputs of the OR gates 217, 217', 217" and applies them to AND gate 221. AND gate 221 is disabled by flip-flop 223 during the interval when the active storage registers are being cleared and new data is being entered, to prevent accidental operation of the sign change detecting circuits.

The output of AND gate 221, indicative of a sign change being detected resets flip-flop 198. This terminates the enable signal, and no further pulse trains are provided at this time from this circuitry of FIG. 3. The data in the shift register continues to be sent to the machine shop, and the counter continues until the end of its count. The data in the accumulators at this time is that which has been received until the sign change was detected. The delay line receives a pulse from the one-shot pulses and operates to transfer this data into the shift register. The next data request pulse initiates the transmittal of the shift register data as before. However, the command words will take less than 15-milliseconds to execute, and therefore the machine tool will not be suddenly commanded to reverse direction in response to the next block of data which will be sent from the shift register, which will commence with the data having the reversed sign.

Machine shop installation—FIG. 5

FIG. 5 shows a block diagram of the apparatus required at the machine shop. To initiate the operation of this system a card reader 220 has a card inserted therein. The card contains the initial address of the program which is desired. The card reader generates electrical signals which are transmitted to the address and storage register, as shown in FIG. 1, which is associated with this particular machine shop. It should be understood that, while punched cards and punched card readers are indicated for the address storage and address signal generating equipment at the machine sehop terminal, there are merely exemplary of the program requesting structure. The machine shop can just as easily have an index of programs and someone can telephone the requested program to the central system, where the address is entered into the central processor address storage register through any suitable input means, such as a typewriter. Also, the typewriter can be located at the machine shop and operated there in the manner of a teletypewriter, if desired.

Upon insertion of a program requesting card into the reader, a switch 222 is momentarily actuated. This causes a flip-flop circuit 224 to be driven to its set state. The set output of the flip-flop 224 is applied to an AND gate 226 and also drives a second flip-flop 228 to a reset state. The second flip-flop is driven to its set state, whenever it is desired to stop the operation, by the momentary actuation of a switch 229 which is connected to the set input of the flip-flop 228. With the flip-flop 228 in its reset state, its reset output is applied to an AND gate 230. This AND gate is enabled whenever a zero detecting circuit 232 detects that a counter 234 contains its zero count condition. At the outset, the counter 234 is in its zero count condition. Accordingly, AND gate 230 is enabled whereby AND gate 226 is enabled and an output pulse is applied therefrom to a delay line 236. The delay line provides three sequential output pulses. The first of these resets the respective storage registers 238, 240, 242, 244. These storage registers respectively store the X command and sign, the Y command and sign, the Z command and sign, and the instruction words. The second output of the delay line enables transfer gates respectively 246, 248, 250, and 252 to transfer data from a shift register 254 into the respective storage registers. The respective transfer gates 246, 248, 250, and 252 transfer the X and sign data, Y and sign data, Z and sign data, and the instruction words respectively into the storage registers 238, 240, 242, and 244. Initially, there is no data in the shift register and thus the data which is transferred constitutes all zeros.

The last pulse out of the delay line drives a flip-flop 256 to its set state. The set output of this flip-flop is applied to an AND gate 258 which has as its second input clock pulses from a clock oscillator 260. Thus the AND gate 258 can drive counter 234 to a counting cycle.

The arrangement for obtaining the number of pulses corresponding to the code words in the X, Y, and Z sign storage registers is identical with the one described in connection with FIG. 3. There are a set of gates, respectively 258, 260, 262, for each one of the X, Y, and Z storage registers. These gates are set in accordance with the code word stored therein. The respective sets of gates 258, 260, and 262 are all connected in parallel to the output of the counter 234. The gates permit pulses to pass therethrough in accordance with the code word stored in the respective registers. The output from all of the respective gates 258, 260, 262 are collected by means of common busses, respectively 264, 266, 268. The pulse trains on these common busses comprise the respective command pulse trains for the three axes. These, together with the sign information, are provided to servo control system 274 of the machine tool. This equipment is well known. An example of a suitable type of this equipment is shown and described in the McGarrell Patent No. 3,079,522 previously referred to. The command pulse trains and signs for each one of the axes and the instruction words, which are required for operating the machine tool, are furnished by the simple equipment installation shown in FIG. 5 at the machine tool which is operated from the information provided from the central location.

It was pointed out that at the outset the gates do not pass any pulses, since the words in the storage registers all correspond to zero. However, in response to the further requests for data provided by the delay line outputs, the apparatus previously described begins to furnish the said data which comprises the serially transmitted output of shift register 202 together with clock pulses. These are simultaneously applied to an AND gate 270 which enables them to be entered into the shift register 254. Meanwhile, the counter 234 has counted a full cycle, whereupon the zero detector 232 emits a pulse which resets flip-flop 256 and which is passed through AND gate 230 to AND gate 226 and therethrough to the delay line 236. The delay line sequentially resets the storage registers, enables the transfer gates to transfer the data in the shift register 254 in parallel fashion into the respective axis storage registers and instruction storage register, and then drives the flip-flop 256 to its set state and sends back a request for more data.

The AND gate 259 is once again enabled whereby the clock oscillator can drive the counter 234 and the respective motion command pulse trains are received from the outputs of the respective gates 258, 260, and 262. When the counter 234 again reach zero, this is indicative of the fact that all the pulses indicated by the respective words stored in the X, Y and Z storage registers have been generated for the 15-millisecond increment data which was transmitted. Once again, the zero detector resets flip-flop 256, thus terminating further pulse input to the counters 234 and initiating the transmission of another request for data.

The operation which has been described continues until the entire program data has been transmitted to the machine shop. The program data which is stored in the central processor will have an end-of-program code. This is inserted in the instruction word portion of the program segment. An end-of-program code detector 272 detects this and applies a signal to the set flip-flop 224. This terminates further operation of the apparatus. This signal also serves as a resetting signal, where required, and also can be used to illuminate indicators, if desired, of this fact.

There has accordingly been described and shown herein a novel, useful, and unique system whereby a single central processor can provide program data to a plurality of numerically controlled machine tools for operating these machine tools, whereby duplicate installation of the required equipment for translating program data which is in record form is eliminated.

The embodiments of the invention in which an exclusive property or privilege is claimed are defined as follows:

1. A system for controlling a plurality of machine tools which are located remotely from a central processing location, comprising:
   memory means at said central processing location for storing at different address locations therein different programs, each of which comprises numerical machine tool control data;
   a plurality of machine tool locations;
   means at each machine tool location for generating signals representative of the address in said memory of a predetermined one of said programs;
   means at said central processing location for receiving and storing the address signals generated at each of said machine tool locations;
   means for transmitting said address signals from said machine tool locations to said address signal storing means at said central processing location;
   means for reading out of said memory in sequence each program the address of which has been received;
   means for transmitting to each machine tool location the program which has been read from said memory at the address in said memory which was transmitted from said machine tool location; and
   means at each machine tool for converting a received program into signals usable by said machine tool.

2. Apparatus as recited in claim 1 wherein each of said programs which is stored in said memory comprises a plurality of program increments each having an address incrementally different from the address of the preceding program increment,
   the address transmitted from said machine tool location being the address of a first of said program increments, and
   means at said central processing location for incrementing a stored address in response to which a program segment has been read out of said memory.

3. Apparatus as recited in claim 2 wherein each said program increment includes a motion command and an instruction word for a machine tool, and means at said central processing location for dividing each program increment motion command and instruction word into a plurality of smaller motion command and instruction words.

4. Apparatus as recited in claim 3 wherein said means for dividing each program increment motion command and instruction word into a plurality of smaller motion command and instruction words includes:
   means for storing a program increment and instruction word,
   means for generating motion command pulse trains responsive to said motion command and instruction words,
   means for establishing a sequence of uniform time increments,
   means for measuring the number of pulses in a motion command occurring over one of said uniform increments, and
   means for generating a motion command word representative of said number of pulses.

5. Apparatus as recited in claim 3 wherein said means for transmitting to each machine tool location the program which has been read from said memory includes means for transmitting sequentially said plurality of smaller motion command and instruction words to said machine tool locations on demand therefrom.

6. Apparatus as recited in claim 1 wherein said means for transmitting to a machine tool location a program which has been read out of said memory from a location at the address in said memory specified by said machine tool location includes:
  means for converting said program into a sequence of motion command words and instruction words each for controlling a machine tool for a predetermined time increment, and
  means for transmitting said sequence of motion command words and instruction words to said machine tool.

7. Apparatus as recited in claim 6 wherein said means for converting said program into a sequence of motion command words and instruction words each for controlling a machine tool for a predetermined time increment includes:
  means for establishing a sequence of predetermined intervals,
  means for converting the numerical machine tool control data of a program into a sequence of control pulse trains and instruction words for controlling a machine tool for each of said predetermined intervals, and
  means for converting each control pulse train and instruction word into a motion command word and instruction word.

8. Apparatus as recited in claim 1 wherein said means for transmitting to a machine tool location a program which has been read out of said memory from a location at the address in said memory specified by said machine tool location includes means at said processing location for converting said program into motion command words and instruction words for controlling a machine tool for a predetermined time increment, said means at said machine tool location for converting data into motion command signals and instruction words for operating said machine tool including means for storing received motion command and instruction words,
  means for converting said stored motion command words into motion control pulse trains for said machine tool, and
  means at said machine tool responsive to the termination of the operation of said means for converting motion command words into motion command pulse trains for transmitting a signal to said means at said processing location for converting program data into motion command and instruction words to transmit to said machine tool the next motion command word and associated instruction word.

9. Apparatus as recited in claim 1 wherein the said means at said central processing location for storing the program addresses requested by said plurality of machine tool locations comprises:
  an address storage register means associated with each machine tool location,
  said means for sequentially reading out the programs the addresses of which have been stored includes means at each machine tool location for generating a request for data signal,
  counter means for sequentially generating a count signal for each one of said plurality of address storage means,
  means at said central processing location for receiving and storing each request for data signal, and
  means responsive to a signal from said counter means and a request for data signal from a machine tool location for enabling a program to be read out from said memory from the address stored in the address storage means associated with said machine tool location.

10. Aparatus for controlling a plurality for numerically controlled machine tools which are located remotely from a central processing location comprising:
  memory means at said central processing location for storing at predetermined address locations a different machine tool control program,
  means at each machine tool location for generating signals representative of the address of a program in said memory means and a request for data signal,
  means at said central location for separately storing the addresses and request for data signals from said plurality of numerically controlled machine tool locations,
  means for sequentially enabling said memory to be addressed by an address in said address storage means in the presence of a data request signal from the machine tool location from which said address was transmitted,
  means for converting the program read from an address location in said memory means into motion command words and associated instruction words for commanding a machine tool for a predetermined increment,
  means for successively transmitting said motion command words and associated instruction words to the machine tool location requesting said program, and
  means at said machine tool location for utilizing said successively transmitted motion command words and associated instruction words for machine tool control.

11. Apparatus as recited in claim 10 wherein each said program which is stored in said memory means comprises a plurality of program increments, each of which is stored at an address location which is incrementally different from the preceding program increment,
  the address transmitted from a machine tool location constituting the address of a first program increment,
  each said plurality of address storage means at said central processing location including means for incrementing the address after said memory means has been addressed with the address stored in said address storage means.

12. Apparatus as recited in claim 10 wherein each said program which is stored in said memory comprises a plurality of program increments, each said program increment comprising a motion command word and instruction word,
  said means for converting a program into a sequence of motion command words and instruction words for operating a numerically controlled machine tool for a predetermined interval includes
  means responsive to the motion command word of a program increment for generating motion control pulse trains responsive to said motion command words,
  means responsive to a data request signal from said machine tool location for generating a timing signal having the duration of said predetermined interval,
  means for enabling said means for generating said motion command pulse train generating means responsive to and over the interval of said timing signal for accumulating the pulses of said generated motion command pulse trains over said predetermined interval and producing motion command data word signals representative thereof,
  means for transmitting said motion command data words and instruction words to the machine tool location responsive to a data request signal from said machine tool location, and
  means for generating a data request signal for said memory responsive to the total conversion of program increment motion command words into motion command pulse trains.

13. Apparatus for controlling from a central location a plurality of remotely located numerical control machine tools comprising:

15 memory means at said central location for storing therein at different address locations programs for controlling a numerically controlled machine tool, each said program comprising a plurality of program increments successively stored at address locations which differ incrementally from a preceding program increment address, means at each machine tool location for generating and transmitting to said central location address signals representative of the address of a first program increment of a desired program and a data request signal, a plurality of address storage registers at said central location each of which is associated with a different one of said numerically controlled machine tool locations, means for entering the address signals generated at a machine tool location into the associated address storage register, counter means for sequentially generating a count signal for each one of said address storage means, a plurality of gating means each of which is associated with a different one of said address storage register, each of said gating means being enabled to address said memory means with the address in an address storage means responsive to an associated count signal and a data request signal from an associated machine tool location, means for incrementing the address in an address storage means after its associated gate means has been enabled to address said memory means, a data converter means associated with each one of said machine tool locations, each said data converter means including means for receiving the program increment read from said memory means responsive to the address in said address storage means associated with said machine tool location for converting said program increment into successive motion command words and associated instruction words for operating a numerically controlled machine tool for successive predetermined increments, means for transmitting said motion command words and associated instruction words successively to said machine tool location, and means at said machine tool location for utilizing said successive motion command words and instruction words and for initiating the transmission of a data request signal at the completion of the utilization of each said motion command words.

14. A system for controlling a plurality of machine tools from a central location said system comprising:

memory means adapted for positioning at said central location for storing a plurality of different addressable programs each of which comprises numerical machine tool control data designated to controllably direct the operation of a machine tool in the carrying out of a respective series of machining operations, means coupled to said memory means for addressing a given plurality of said programs and developing respective sequences of control signals in response thereto each sequence representing a different one of said programs, and means coupled to said last named means for directing successive portions making up the entirety of each control signal sequence to a respective machine tool.

15. Apparatus according to claim 14 wherein said means for addressing said programs comprises means responsive to address signals conditionally generated at each location of a machine tool, each address signal identifying a particular program in accordance with which it is desired to control the operation of a given machine tool.

16. Apparatus according to claim 14 wherein said last named means comprises means responsive to successively produced demand signals generated at each machine tool location for respectively directing each successive portion of a control signal sequence to the machine tool at said location.

17. A system for automatically producing a plurality of work products each having a geometrically different configuration from one another said system comprising:

a plurality of numerically controllable machine tools each adapted for control by a control signal sequence to carry out a discrete series of machining operations on a work piece pursuant to the production of a work product from the work piece, memory means for storing a plurality of different electrically addressable programs each of which defines numerical machine tool control data designated to controllably direct the operation of a machine tool in the carrying out of a respectively different series of machining operations for the purpose of producing a work product having a respectively different geometric configuration, means coupled to said memory means for addressing a given plurality of said programs and developing respective sequences of control signals in response thereto each sequence representing a different one of said programs, and means coupled to said last named means for communicating successive portions making up the entirety of each control signal sequence to a respective one of said numerically controllable machine tools.

18. Apparatus according to claim 17 wherein there is additionally provided means associated with each machine tool for selectively producing one at a time a plurality of address signals each corresponding to a different one of said programs and wherein said means for addressing said programs includes means responsive to any given address signal for accessing a given one of said programs and means coupling said address signal producing means to said last named means to effect control of a given machine tool in accordance with a selected program identified by the address produced by said address producing means.

19. Apparatus according to claim 18 wherein there is additionally provided means associated with each machine tool for temporarily storing each successive portion of a given control signal sequence and wherein there is provided means coupled to said last named means and to said means for communicating said successive portions for controlling the timing between the periods during which successive portions making up the entirety of a control signal sequence are communicated to a machine tool.

References Cited

UNITED STATES PATENTS

| 2,736,852 | 2/1956 | Nelson | 318—20.105 |
| 3,079,522 | 2/1963 | McGarrell | 318—20.370 |
| 3,172,026 | 3/1965 | Schuman | 318—20.105 |
| 3,181,121 | 4/1965 | Losch et al. | |
| 3,359,544 | 12/1967 | Macon et al. | 340—172.5 |

OTHER REFERENCES

The AM editors. NC tomorrow. In American Machinist. 108 (22): p. NC sup 9–10. Oct. 26, 1964. TJ 1 A4.

JOHN P. VANDENBURG, Primary Examiner

U.S. Cl. X.R.

235—151.11; 318—18, 28, 162